(12) United States Patent
Massicot et al.

(10) Patent No.: US 10,248,780 B2
(45) Date of Patent: Apr. 2, 2019

(54) METHOD AND DEVICE FOR SECURING AN OBJECT, CORRESPONDING CONTROL METHOD AND DEVICE SECURED OBJECT

(71) Applicant: Advanced Track and Trace

(72) Inventors: Jean-Pierre Massicot, Rueil-Malmaison (FR); Alain Foucou, Rueil-Malmaison (FR); Zbigniew Sagan, Rueil-Malmaison (FR)

(*) Notice: Subject to any disclaimer, the term of this patent is extended or adjusted under 35 U.S.C. 154(b) by 54 days.

(21) Appl. No.: 15/114,819

(22) PCT Filed: Feb. 6, 2015

(86) PCT No.: PCT/EP2015/052501
§ 371 (c)(1),
(2) Date: Jul. 27, 2016

(87) PCT Pub. No.: WO2015/118102
PCT Pub. Date: Aug. 13, 2015

(65) Prior Publication Data
US 2016/0350524 A1 Dec. 1, 2016

(30) Foreign Application Priority Data
Feb. 7, 2014 (FR) ..................... 14 50979

(51) Int. Cl.
| | |
|---|---|
| *G06F 21/32* | (2013.01) |
| *G06F 21/36* | (2013.01) |
| *G06K 19/06* | (2006.01) |
| *G07D 7/20* | (2016.01) |

(Continued)

(52) U.S. Cl.
CPC .......... *G06F 21/36* (2013.01); *G06F 21/6209* (2013.01); *G06K 19/06037* (2013.01);
(Continued)

(58) Field of Classification Search
None
See application file for complete search history.

(56) References Cited

U.S. PATENT DOCUMENTS 8,392,715 B2   3/2013  Massicot et al.
8,891,862 B1*  11/2014 Wolk ................... G06K 9/4652
                                              382/162
(Continued)

FOREIGN PATENT DOCUMENTS

EP   2 325 022 A1   5/2011
FR   2 915 600 A1   10/2008

OTHER PUBLICATIONS

Color Quick Response Code for Mobile Content Distribution. Nurwono. MoMM. ACM. (Year: 2009).*

(Continued)

*Primary Examiner* — Venkat Perungavoor
(74) *Attorney, Agent, or Firm* — Patshegen IP LLC; Moshe Pinchas (57) ABSTRACT

A device to secure an object receives a digital file representing a photograph as an input. The photogram represents at least one portion of the object. An encoder of the device encodes characteristic elements of the photograph into a matrix code. The device further includes a printer to print the matrix code on or in the object. The photograph can represent biometric data of a person, which are also visible on the object. An image sensor can be used to input the digital file representing the photograph and is configured to take an image of the object on which the matrix code is printed.

16 Claims, 8 Drawing Sheets

(51) Int. Cl.
  *G07F 7/08* (2006.01)
  *G07D 7/2033* (2016.01)
  *G06F 21/62* (2013.01)
  *G06K 19/10* (2006.01)
  *G07D 7/0047* (2016.01)
  *H04L 9/32* (2006.01)
  *G06K 19/08* (2006.01)

(52) U.S. Cl.
  CPC ........... *G06K 19/10* (2013.01); *G07D 7/0047* (2017.05); *G07D 7/20* (2013.01); *G07D 7/2033* (2013.01); *G07F 7/082* (2013.01); *G06K 19/08* (2013.01)

(56) References Cited

U.S. PATENT DOCUMENTS

2005/0067487 A1  3/2005  Brundage et al.
2009/0261158 A1  10/2009  Lawson
2012/0253787 A1*  10/2012  Al-Omari ........... G06F 17/2223
                                          704/8
2013/0287270 A1*  10/2013  Harper ............... G06K 9/00073
                                          382/124

OTHER PUBLICATIONS

A QR Code Based Zero Watermarking Scheme for Authenticaiton of Medical Images in Teleradiology Cloud. Seenivasagam. Hindawi. (Year: 2013).*
Decoding Robustness Performance Comparison for QR and Data Matrix Code. Kulshreshtha. ACM. (Year: 2012).*
Facial Biometrics for 2D Barcodes.Querini et al. IEEE. (Year: 2012).*
Multi-Layered Security by Embedding Biometrics in Quick Response(QR) Codes. Lakshmanaswamy et al. IJERT. (Year: 2014).*
Banknote authentication using chaotic elements technology. Ambadiyil et al. SPIE. (Year: 2017).*

* cited by examiner

METHOD AND DEVICE FOR SECURING AN OBJECT, CORRESPONDING CONTROL METHOD AND DEVICE SECURED OBJECT

RELATED APPLICATIONS

This application is a § 371 application from PCT/EP2015/052501 filed Feb. 6, 2015, which claims priority from French Patent Application No. 14 50979 filed Feb. 7, 2014, each of which is incorporated herein by reference in its entirety.

TECHNICAL FIELD OF THE INVENTION

The present invention concerns a method and a device for securing an object, a corresponding control method and device and a secured object. It applies, in particular, to the securing of objects and documents against content changes (integrity) and counterfeits (copies).

BACKGROUND OF THE INVENTION

There are many known ways of securing content or a message borne on a medium. For example, encoding or encryption is applied to the data constituent of this message. However, simply knowing the decoding or decryption key makes it possible to access the message. However, these keys must be stocked on media, eg paper, plastic or electronic, or on servers. Irrespective of whether these keys are carried by the user or stored in a computer system, a malicious third party with the right tools can access them.

These securing methods are therefore inadequate.

OBJECT AND SUBJECT OF THE INVENTION

The present invention aims to remedy all or part of these drawbacks.

To this end, according to a first aspect, the present invention envisages a device for securing an object, which comprises:
 a means for inputting a digital file representing a photograph that represents at least one portion of the object;
 a means for encoding characteristic elements of the photograph into a matrix code; and
 a means for printing the matrix code on or in said object.

Thanks to these provisions, by decoding the matrix code, one can access characteristic elements of the photograph and compare these characteristic elements with those of the object. In this way, one is assured, firstly, of the integrity of the object and, secondly, that the matrix code is not associated to an object other than the one for which it is intended.

According to the embodiments, the photograph is:
 representative of biometric data of a person, for example his fingerprints or his face, data items which are moreover carried by the object; or
 a photograph of a portion of the object, for example an accounting or contractual document, or a luxury object.

The characteristic elements of the photograph are, for example, a compression of the photograph, biometric measurements, measurements taken of the object represented in the photograph and/or fingerprint minutiae.

In some embodiments, the matrix code comprises a plurality of zones representing the characteristic elements of the photograph.

In some embodiments, the device comprises a means for encoding a message in a copy-protection mark, the matrix code printed by the printing means comprising a zone representative of the copy-protection mark.

In some embodiments, the means for encoding a message encodes the message utilizing characteristic elements.

In some embodiments, the means for encoding a message scrambles the message, during the encoding, according to the characteristic elements.

In some embodiments, the means for encoding characteristic elements encodes the characteristic elements utilizing characteristic elements.

In some embodiments, the encoding means comprises a means for compressing the photograph.

In some embodiments, the means for compressing performs a compression in JPEG (acronym for Joint Picture Expert Group) format.

In some embodiments, the means for inputting a digital file representative of a photograph comprises an image sensor configured to take an image of the object on which the matrix code is printed.

In some embodiments, the means for inputting a digital file representative of a photograph comprises an image sensor for capturing a fingerprint.

In some embodiments, the means for encoding comprises a means for extracting fingerprint minutiae.

In some embodiments, the means for encoding implements a public key for encoding the content of the matrix code.

According to a second aspect, the present invention envisages a method for securing an object, which comprises:
 a step of inputting a digital file representing a photograph that represents at least one portion of the object;
 a step of encoding characteristic elements of the photograph into a matrix code; and
 a step of printing the matrix code on or in said object.

According to a third aspect, the present invention envisages a device for controlling an object, which comprises:
 a means for capturing a photograph of at least one portion of the object;
 a means for capturing a photograph of a matrix code carried by said object;
 a means for decoding characteristic elements of a photograph encoded in the matrix code; and
 a means for verifying the match between the photograph of at least one portion of the object and the decoded characteristic elements.

According to a fourth aspect, the present invention envisages a control method for an object, which comprises:
 a step of capturing a photograph of at least one portion of the object;
 a step of capturing a photograph of a matrix code carried by said object;
 a step of decoding characteristic elements of a photograph encoded in the matrix code; and
 a step of verifying the match between the photograph of at least one portion of the object and the decoded characteristic elements.

According to a fifth aspect, the present invention envisages an object carrying a matrix code encoding characteristic elements of a photograph representative of at least one portion of the object.

As the particular features, advantages and aims of this securing method, this control device, this control method and this object are similar to those of the reading device that is the subject of the present invention, they are not repeated here.

BRIEF DESCRIPTION OF THE FIGURES

Other advantages, aims and particular features of the present invention will become apparent from the description that will follow, made, as a non-limiting example, with reference to drawings included in an appendix, wherein.

DETAILED DESCRIPTION OF THE EMBODIMENTS

It is, as from now, noted that the figures are not to scale.

Figure 1:
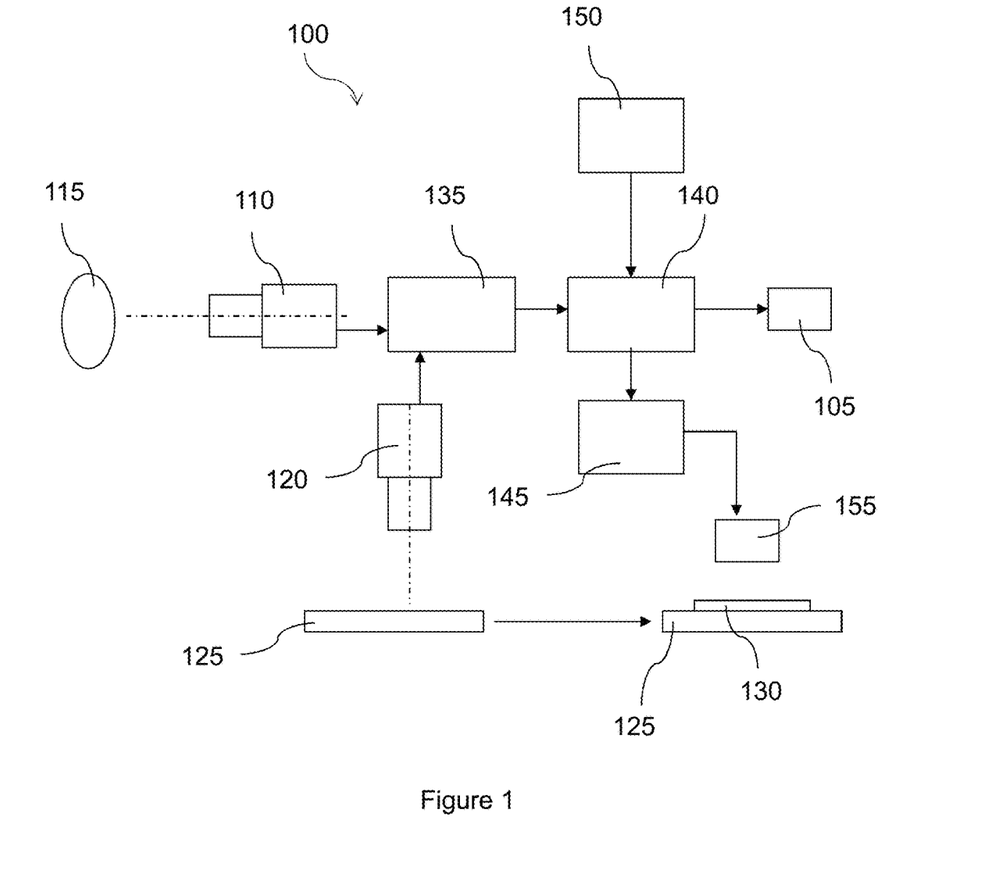
FIG. 1 represents, schematically, a particular embodiment of the device for securing subject of the present invention.

FIG. 1 shows a device 100 for securing an object 125, which comprises:

- a means 110 for capturing a digital photograph of a person, generally a carrier of the object 125 and/or a signatory of a message carried by the object 125;
- a means 120 for capturing a digital photograph of at least one portion of the object 125;
- a means 135 for extracting characteristic elements of one, at least, of the photographs made by one of the capture means 110 and 120;
- a means 150 for generating a message;
- a means 140 for encoding the message and characteristics of photographs;
- a means 145 for incorporating the encoded message and encoded characteristics in a digital matrix code;
- a means 155 for printing, on or in the object 125, the analog matrix code 130 representative of the digital matrix code; and
- a storage means 105.

The means 110 and 120 for capturing digital photographs are electronic image sensors, for example electronic video cameras, electronic still cameras or smartphone image sensors.

The means for capturing 110 is configured to capture biometric data of a person, for example fingerprints, the face or the shape of a hand. The means for capturing 110 is, in variants, replaced by a memory storing a digital file representative of these biometric data.

The means 120 for capturing a digital photograph of at least one portion of the object 125 takes an image of the complete object, for example if the object is a luxury product, or at least one of its portions, for example of an identity photo or a photo of fingerprints if the object is an identification document, of data carried by a document, if the object is an accounting or contractual document.

In some variants, only one of the means 110 and 120 for capturing digital photographs is provided in the device subject of the invention.

The means 135 for extracting characteristic elements of one, at least, of the photographs made by one of the means for capturing 110 and 120 implements an image processing program to extract measurements, for example biometric, of at least one captured image. For example, in the case of an image of a face, ratios of lengths between outlines of the eyes, nose, mouth, ears, hair roots can characterize a face.

In the case of an image of a fingerprint, starting from a digital trace whose dimensions and angles have been normalized, singular points (including minutiae) that are also normalized are extracted. It is recalled here that a fingerprint or dactylogram is the result of placing a finger on a medium. The design formed on the medium consists of dermatoglyphs. Fingerprints are unique and characteristic of each individual.

A "digital trace", a broader term, is the result of a contact between a finger and a medium, fingerprints being an example of a digital trace. Papillary traces (or their imprints) group digital traces (or their imprints, in which automatic identification software reference 150 to 200 characteristic points) and palm prints (traces of the palms of the hand, referenced by 1,500 to 2,000 characteristic points).

The digital trace can be:
- visible (or direct): it is called positive when material is affixed and it is called negative when material is removed;
- latent (invisible to the naked eye): the trace come from deposited sweat (secretions from the sweat glands: 99% water that by evaporating leaves behind salts and amino-acids) and/or sebum deposits (sebaceous glands); and/or
- molded: the trace comes from a finger coming in contact with a malleable surface (wax, putty, etc).

The lines of the fingerprints can be broken down into three major design types: arches (including tented arches), left-handed/right-handed loops, and whorls, coils and swirls. These three types of print fit 95% of human fingers: 60% for loops, 30% for whorls and 5% for arches. "Singularities" on the loops, arches or whorls are used to differentiate the patterns from one another:
- global singularities: core or center: where the ridges converge;
- delta: where the ridges diverge;
- local singularities (also known as minutiae): irregular areas at the locations of capillary lines (ending ridges, bifurcations, short ridges assimilated to two ending ridges, enclosures).

In the case of the image of a surface of a document, a known type of content recognition algorithm makes it possible to extract amounts, signatures, ratios of lengths of printed lines, numbers of printed lines, etc.

Extracting characteristic elements can be a simple image compression, for example according to the JPEG (registered trademark) standard.

Lastly, all or part of the image constitutes characteristic elements of the image.

The means for generating a message 150 supplies a message about where the object was manufactured, the production date, the name of the owner of the intellectual property rights on the object, etc. Alternatively, this message is a decoding key for the matrix code 130 or an identifier of a decoding key.

The means 140 for encoding the message and characteristics of photographs performs a known type of encoding, for example encoding with the addition of an error detection and correction code (CRC, for Cyclic Redundancy Check) and an RSA (name formed from the initials of its three inventors, an asymmetric cryptography algorithm) type of encryption and scrambling, to supply a series of numbers representing the message and the extracted image characteristics.

The means 145 for incorporating the encoded message and encoded characteristics in a digital matrix code defines a dot matrix representing the series of numbers of the code supplied by the means for encoding 140. For example, the message is incorporated into a central square, the resolution of which forms a copy-protection mark (ie the degradation of which by the print noise, ie the generation of individually unpredictable ad-hoc errors, leading a dot to be interpreted with an incorrect value, then copy noise can be measured to distinguish an original from a copy).

The means 155 for printing, on or in the object 125, the analog matrix code 130 is, for example, a printer or a marking means utilizing a laser ray.

The storage means 105 is local and/or remote, for example a server memory, in which items of information are stored about the production and marking of the object 125 and, possibly, keys for deciphering information represented by the analog matrix code 130.

Figure 2:
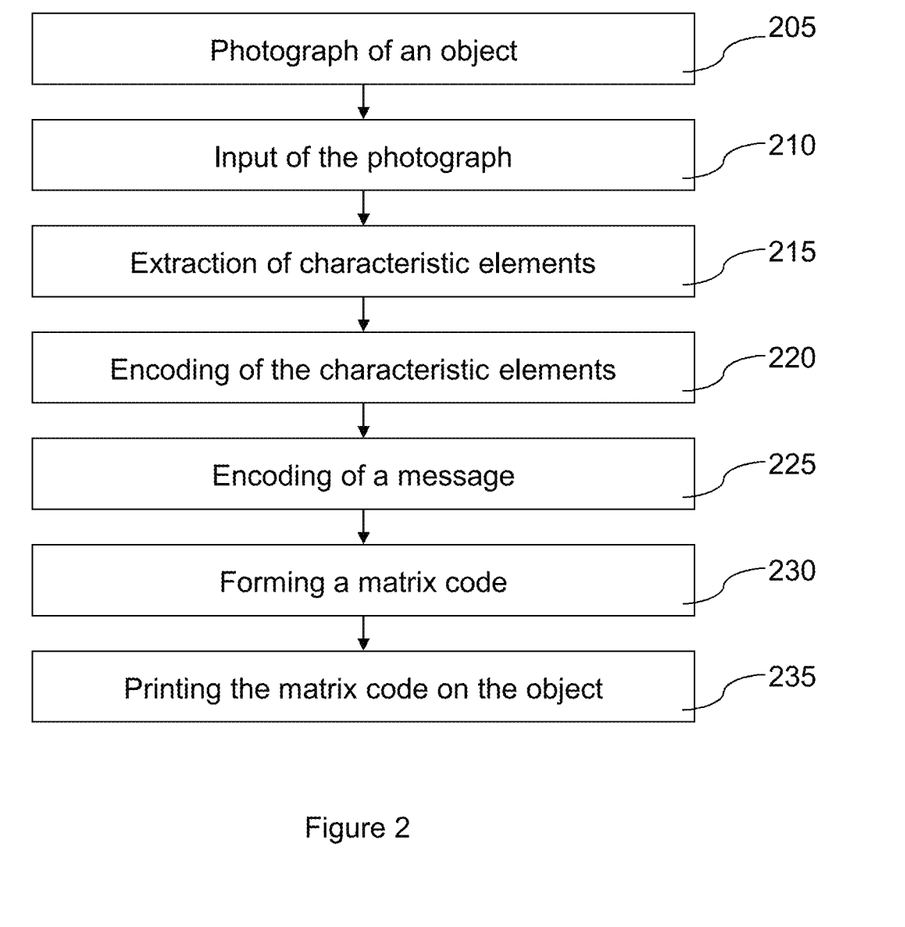
FIG. 2 represents, as a logical diagram, steps in a first particular embodiment of the method for securing subject of the present invention.

In the first particular embodiment of the method for securing subject of the present invention, the first step 205 consists in capturing an image, or photograph, of an object to be secured against forgery and against modifications. During a step 210, the captured image is input into a software system for extracting characteristic elements (measurements, ratios, outlines or dots, for example) or for compression, which, during step 215, supplies these characteristic elements.

During a step 220, the characteristic elements are encoded. During a step 225, a message is encoded. During a step 230, a digital matrix code is formed by incorporating encodings of the characteristic elements and of the message. During a step 235, the digital matrix code is printed on the object of which an image was taken during step 205.

Figure 3:
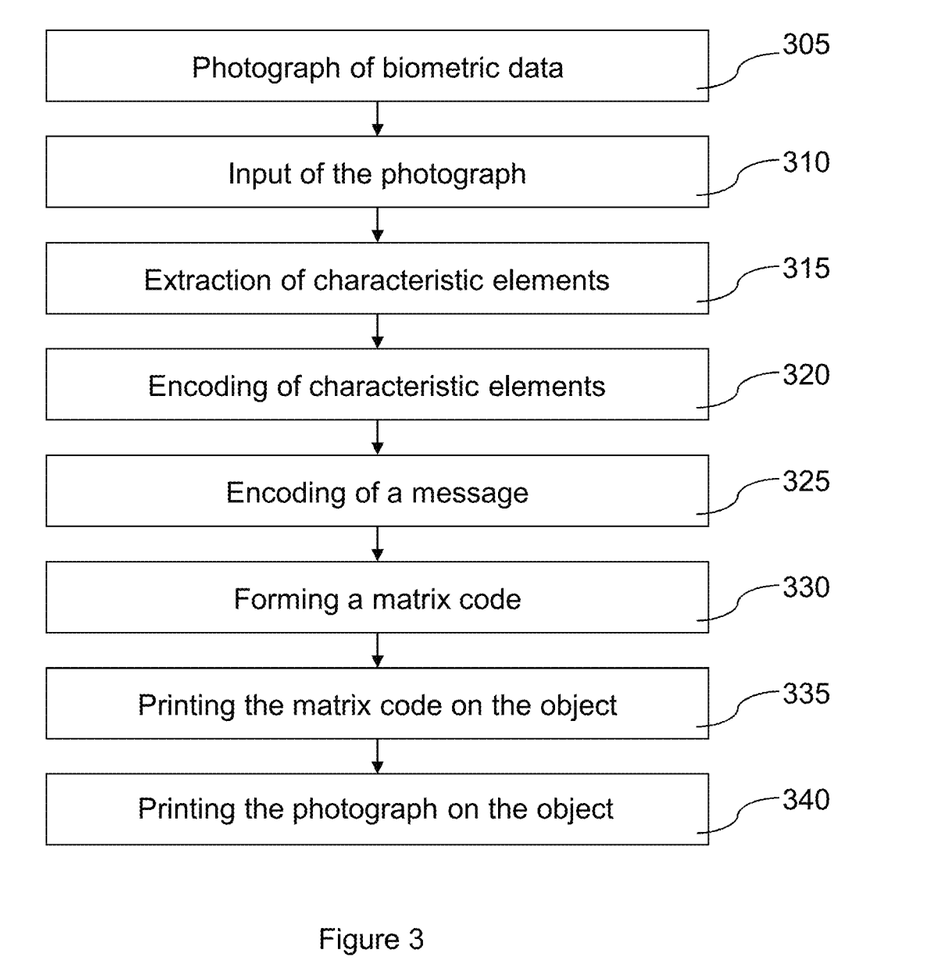
FIG. 3 represents, as a logical diagram, steps in a second particular embodiment of the method for securing subject of the present invention.

In the second particular embodiment of the method for securing that is the subject of the present invention, the first step 305 consists in capturing an image, or photograph, representing biometric elements of a person, for example his face, at least one fingerprint or at least one hand shape. During a step 310, the captured image is input into a software system for extracting characteristic elements (measurements, ratios, outlines or dots, for example) or for compression, which, during step 315, supplies these characteristic elements.

During a step 320, the characteristic elements are encoded. During a step 325, a message is encoded. During a step 330, a digital matrix code is formed by incorporating encodings of the characteristic elements and of the message. During a step 335, the digital matrix code is printed on the object of which an image was taken during step 305. During a step 340, at least one portion of the image captured during step 305 is printed on the object to be secured. In this way, this object is associated in two ways to a person, for example, its author, its signatory or its holder, firstly by the photograph that is printed on its surface and, secondly, by the matrix code that it carries and which represents biometric data from this photograph.

Figure 4:
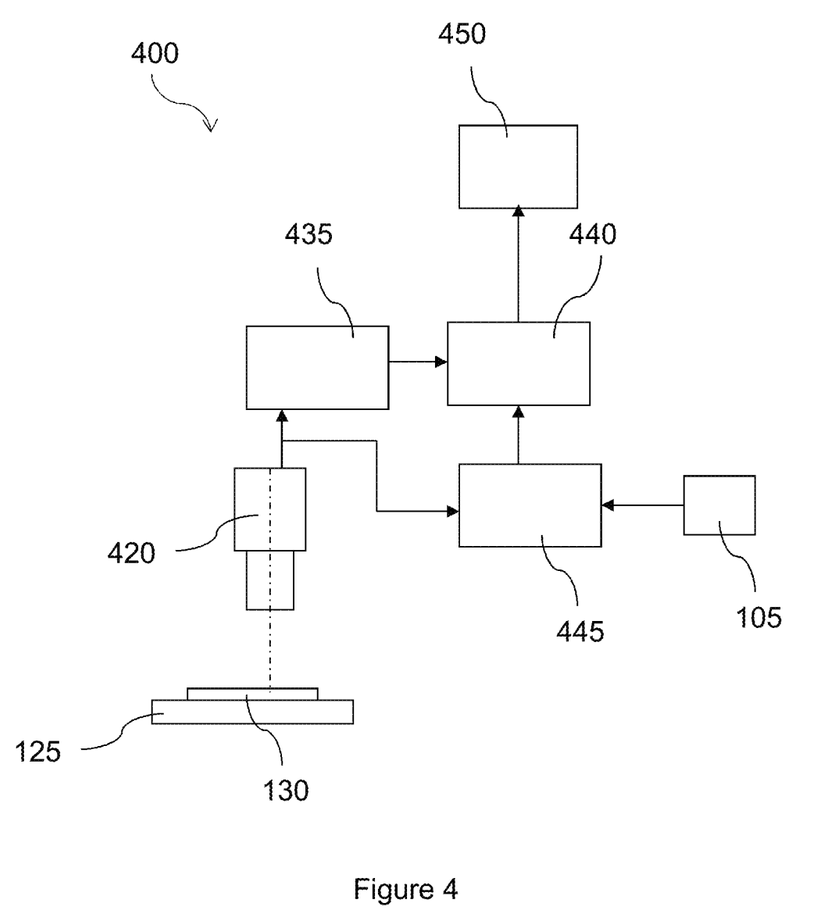
FIG. 4 represents, schematically, a particular embodiment of the device for controlling subject of the present invention.

The device for controlling an object 400 subject of the present invention illustrated in FIG. 4 comprises:
- a means 420 for capturing a digital photograph of at least one portion of the object 125 and of the matrix code 130 carried by this object;
- a means 435 for extracting characteristic elements of one, at least, of the photographs made by the capture means 420;
- a means 445 for decoding characteristic elements of a photograph encoded in the matrix code 130, possibly according to data supplied by the memory 105;
- a means 440 for verifying the match between the characteristic elements of the photograph captured by the capture means 420 and the characteristic elements encoded in the matrix code 130; and
- a means 450 for decoding the message encoded in the matrix code 130, and for verifying the authenticity of the object, in the event of a match between the characteristic elements.

The means 420 for capturing digital photographs is similar to the means 120 except that it is configured to capture an image of sufficient resolution of the matrix code 130 so that it can be read.

The means 435 for extracting characteristic elements is similar to the means 135. The means for decoding 445 performs inverse functions from the encoding means 140. However, the decoding means 445 only decodes the characteristic image elements encoded in the matrix code 130. The means 440 for verifying the match between the characteristic elements of the photograph captured by the capture means 420 and the characteristic elements encoded in the matrix code 130 determines a degree of similarity between these characteristic elements and, if this degree of similarity is greater than a predefined limit value, it supplies an integrity confirmation piece of information for the object 125. Otherwise, it supplies an integrity defect piece of information for the object 125, meaning that its content or its form has been altered, that it is a counterfeit, or that the biometric data encoded in the matrix code 130 do not match the biometric data carried by the object 125.

The means for decoding 450 performs inverse functions from the means for encoding 140. However, the means for decoding 450 only decodes the message carried by the matrix code 130, and only performs this decoding if an integrity confirmation piece of information is supplied by the match verification means 440. In addition, the means for decoding 450 measures the noise carried by the copy-protection code representing the message, for example by counting the error correction rate required to read this message. The means for decoding 450 determines the authenticity of the object as a function of the noise measured: If this noise exceeds a predefined value, which depends on the resolution of the copy-protection code, the object is reported as being a copy. Otherwise, the object is reported to be authentic.

Figure 5:
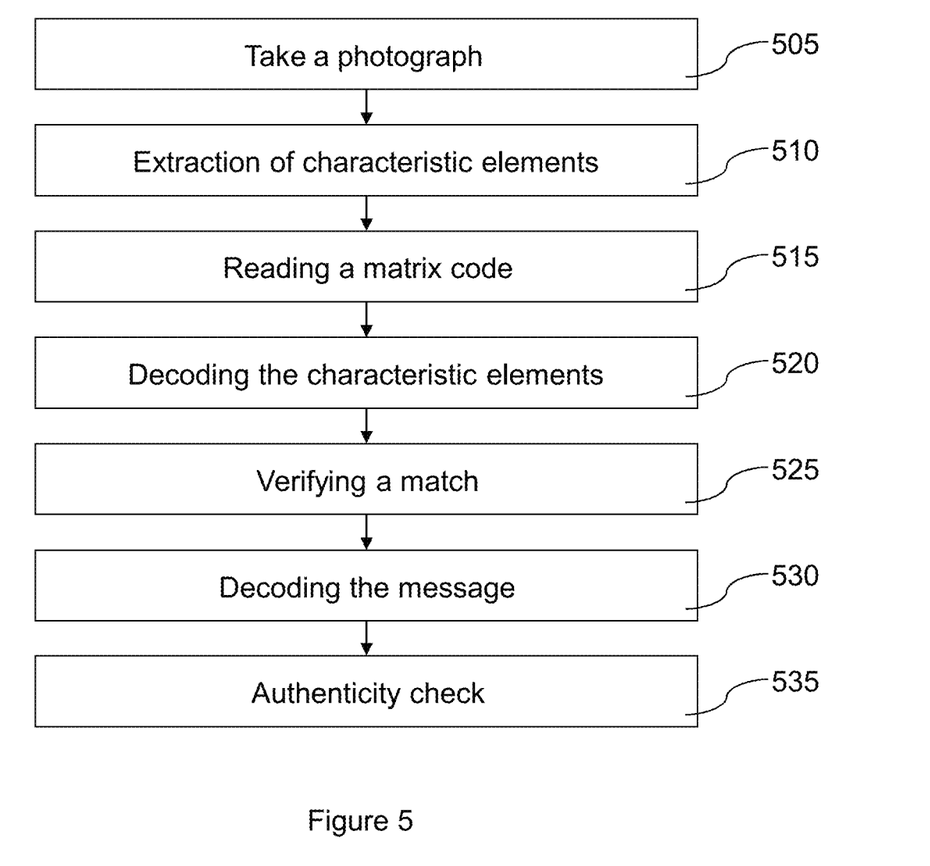
FIG. 5 represents, as a logical diagram, steps in a particular embodiment of the method for controlling subject of the present invention.

FIG. 5 shows, for verifying an object, ie verifying its integrity and its authenticity, a step 505 of capturing a photograph of at least one portion of the object, a step 510 of extracting characteristic elements of the photograph captured, a step 515 of capturing an image of a matrix code representing characteristic elements of a photograph and an additional message, a step 520 of decoding characteristic elements encoded in the matrix code, and a step 525 of verifying the match between the characteristic elements extracted during step 510 and the characteristic elements decoded during step 520.

In this way, it is possible to carry out the verification of the integrity of the content of the document without having to access a database.

If the match is verified during step 525, then during a step 530 the message encoded in the matrix code is decoded and supplied, for example displayed. During a step 535, the noise carried by the copy-protection code representing the message is measured, for example by counting the error correction rate required to read this message. Then the authenticity of the object is determined: If this noise exceeds a predefined value, which depends on the resolution of the copy-protection code, the object is reported as being a copy. Otherwise, the object is reported to be authentic.

As a variant to the embodiments of the control device and method illustrated in FIGS. 4 and 5, the message represented by the copy-protection code represents or identifies a decoding key required to decode the characteristic photographing elements encoded in the digital matrix code 130.

As a variant to the embodiments of the device and method for controlling illustrated in FIGS. 4 and 5, the digital matrix code 130 represents or identifies a decoding key required to decode the message carried by the copy-protection code.

Figure 6:
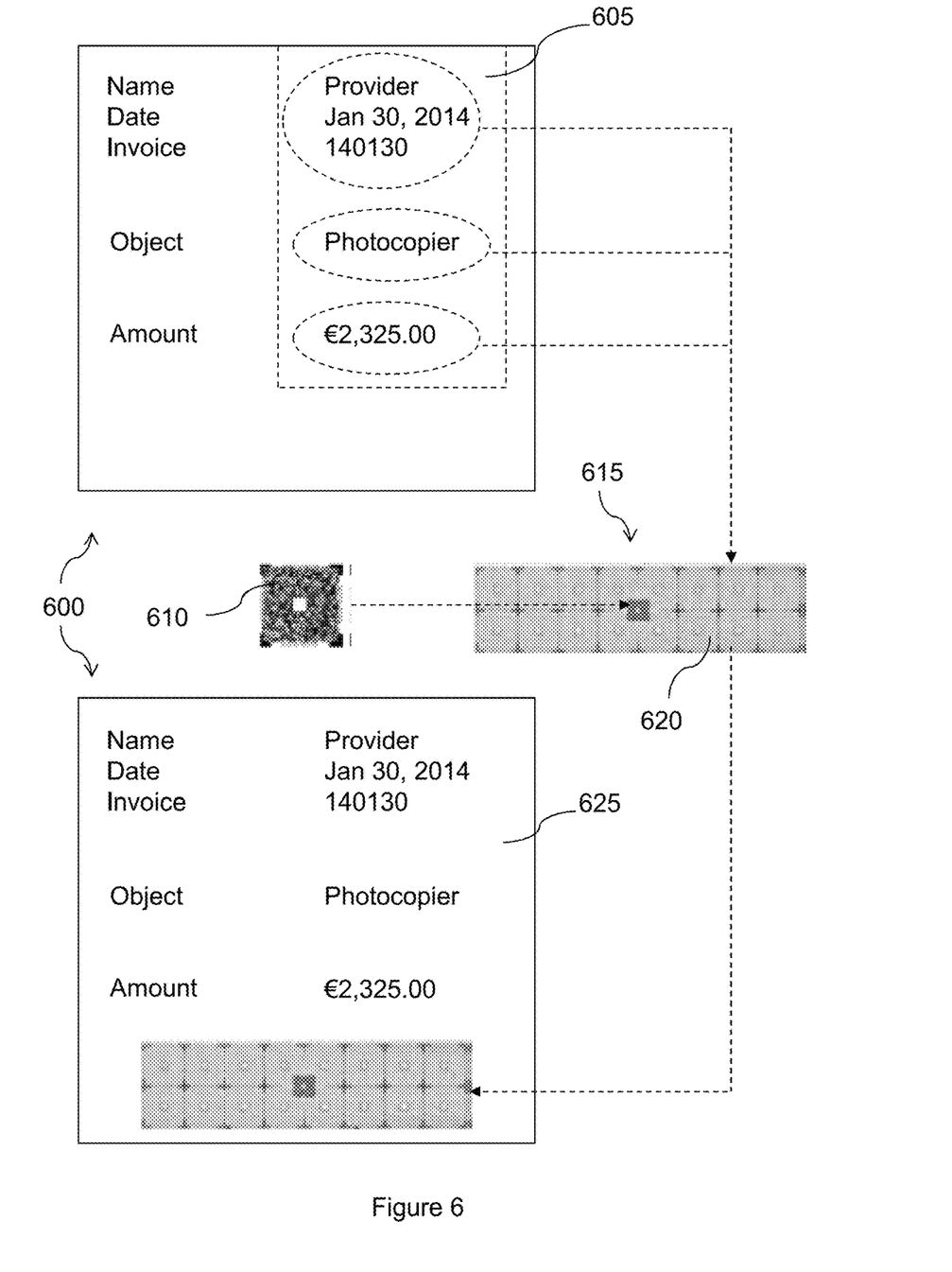
FIG. 6 represents, schematically, a first document to be secured, a protection mark and the document carrying the printed protection mark.

FIG. 6 shows a particular object, 600, here taking the form of a printed document and, more specifically, of an invoice, before securing, above, and after securing, below. The object 600 comprises in a portion 605, a photograph of which is captured, characteristic indications, here the supplier name, the invoice date, the invoice number, the item invoiced, and the invoice amount. To secure this document, these indications are read automatically, for example with an optical character recognition program ("OCR"), and these characteristic elements of the photograph are encoded, in sixteen portions 620 of a digital matrix code 615.

The inventors have determined that such a matrix code has a data storage capacity of at least 4 kilobytes, which makes it possible to store, in asymmetrically encrypted form:
an identity photo;
minutiae; and
other identity information.

A message, for example representing an encoding key or a decoding key, or data relating to the encoding place and time, is encoded in a digital copy-protection code 610. The copy-protection code 610 is incorporated into the digital matrix code 615.

As illustrated in the bottom of FIG. 6, the digital matrix code 615 is printed on the document 600 to secure it. Printing the digital matrix code 615 forms an analog matrix code.

As is easily understood, to verify that the content of the document 600 has not been modified, firstly, a new photograph capture and a new extraction of characteristic elements are carried out, and, secondly, the analog digital matrix code 615 is read to extract the encoded characteristic elements, before verifying the match between these characteristic elements.

It is noted that the match can, in this case, be verified visually by a user, for example after displaying decoded characteristic elements on a screen.

To verify the authenticity of the document 600, the noise carried by the copy-protection code representing the message is measured and compared to a predefined limit value. This limit value is, for example, learned in a learning step (not shown) from original objects 600 and copies made from these objects. In this way, two clouds of noise values are obtained and a limit value is chosen between these value clouds.

Figure 7:
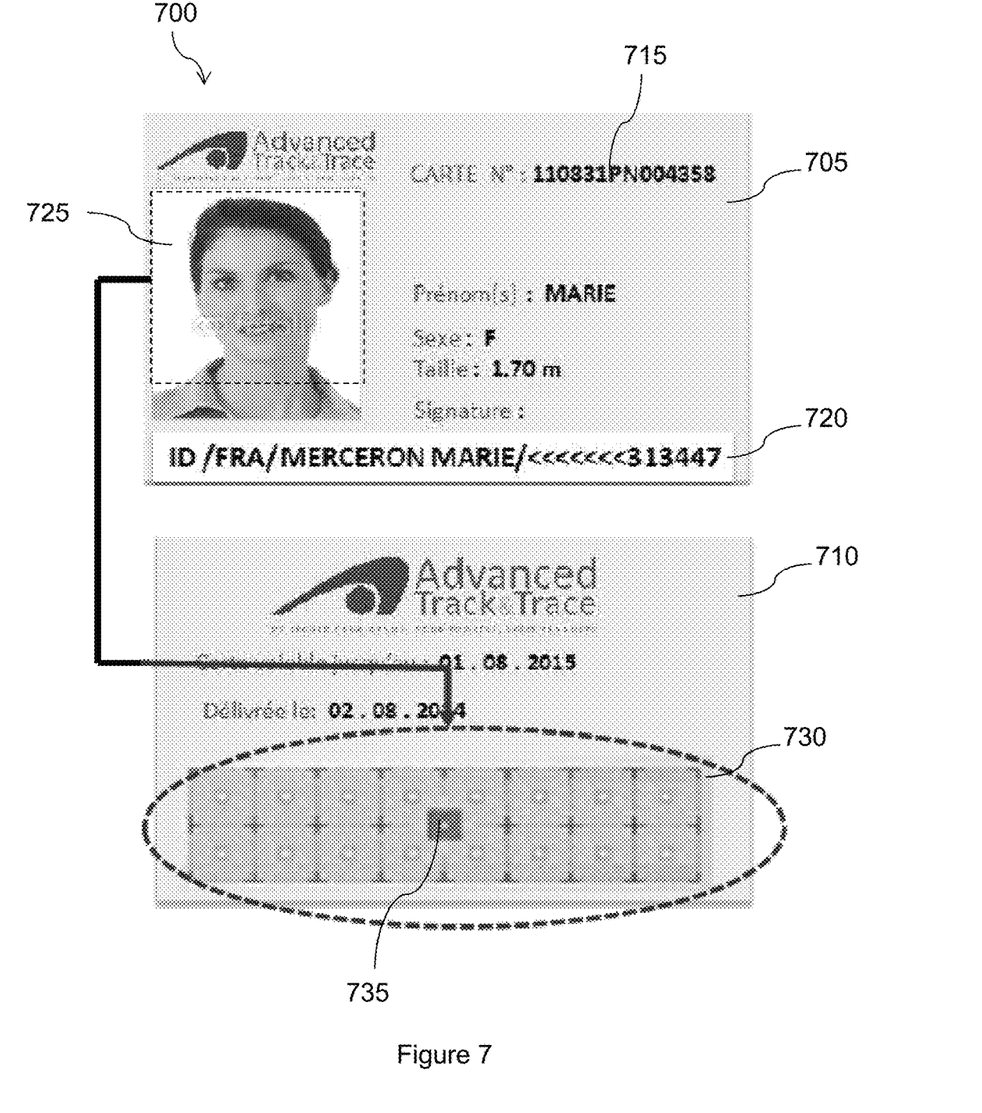
FIG. 7 represents, schematically, the two surfaces of a second secured document.

FIG. 7 shows the front 705 (above) and back 710 (below) of a second secured document 700, taking the form of an identification card, for example an identification document. In this case, the characteristic elements of the identity document comprise the characteristic elements of a photograph 725 of the face of the holder of the document 700. This photograph, possibly compressed, is represented by the matrix code 730. By capturing an image of the photograph 725 and an image of the matrix code 730, then decoding the matrix code 730, one can display, for example on the screen of a smartphone, the photograph represented by the matrix code 730 and verify that the photograph 725 has not been falsified. Once this verification has been carried out, decoding the copy-protection code 735 incorporated in the matrix code 730 makes it possible, firstly, to determine whether the document 700 is a copy and, secondly, to obtain an additional message representing for example written instructions 715 (card number) and 720 (code) carried on the back 705 of the document 700.

Figure 8:
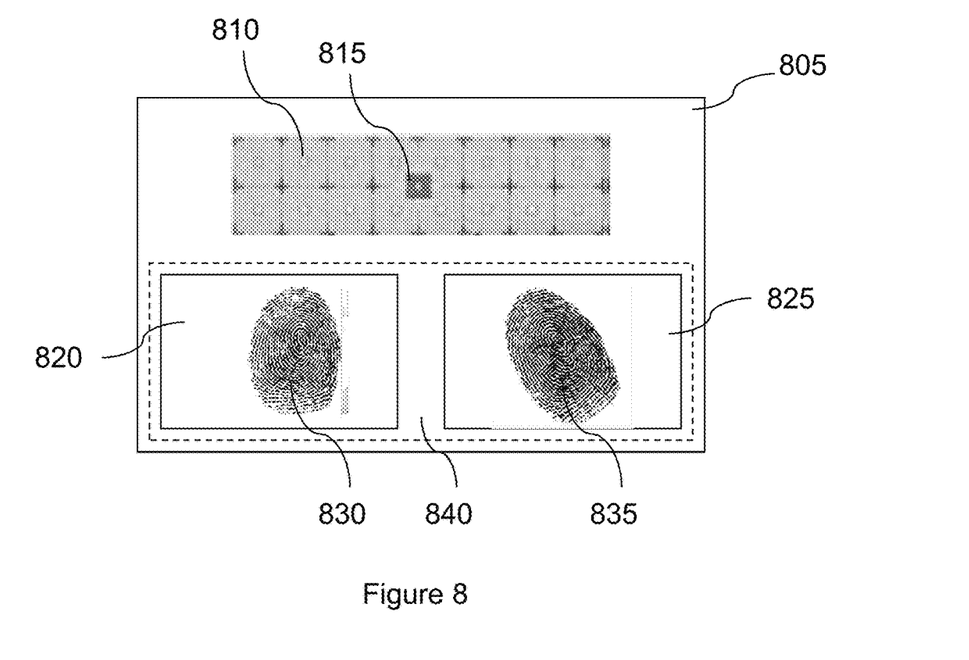
FIG. 8 represents, schematically, an identification card of a person.

FIG. 8 shows an identification object 805 for a person, which comprises:
  a code 810 representing characteristic elements of photographs of fingerprints of the person in question;
  a copy-protection code 815 representing a message, for example representing the last name, first name, nationality and address of the person in question, and the validity end date of the object 805;
  two surfaces 820 and 825 intended to receive fingerprints 830 and 835 of the holder of the object 805, a photograph of each of these prints being taken to verify that the holder of the card is the person in question.

The zone 840 of which a photograph is taken, either for inputting a photograph whose characteristic elements are encoded, or for checking the object, covers the surfaces 820 and 825.

For example, the two surfaces 820 and 825 are silver or black in color, mirror smooth, and are used to place two index fingers or two thumbs.

To use the object 805, the surfaces 820 and 825 are cleaned, the holder of the object places the fingers on the surfaces 820 and 825, the fingers are removed and two images are taken:
  firstly, of the matrix code 810; and
  secondly, of the fingerprints deposited on the surfaces 820 and 825.

Then, one extracts the characteristic elements from the matrix code and the fingerprints, and one verifies that they match. If there is a match, the authenticity of the object 805 is verified and the content of the message is displayed.

In some variants, a code formed of printed characters, on the front or back of the document, plays a role in the reading of the matrix code 810 and/or of the copy-protection code 815, ie is used to determine the decryption or descrambling key.

Figure 9:
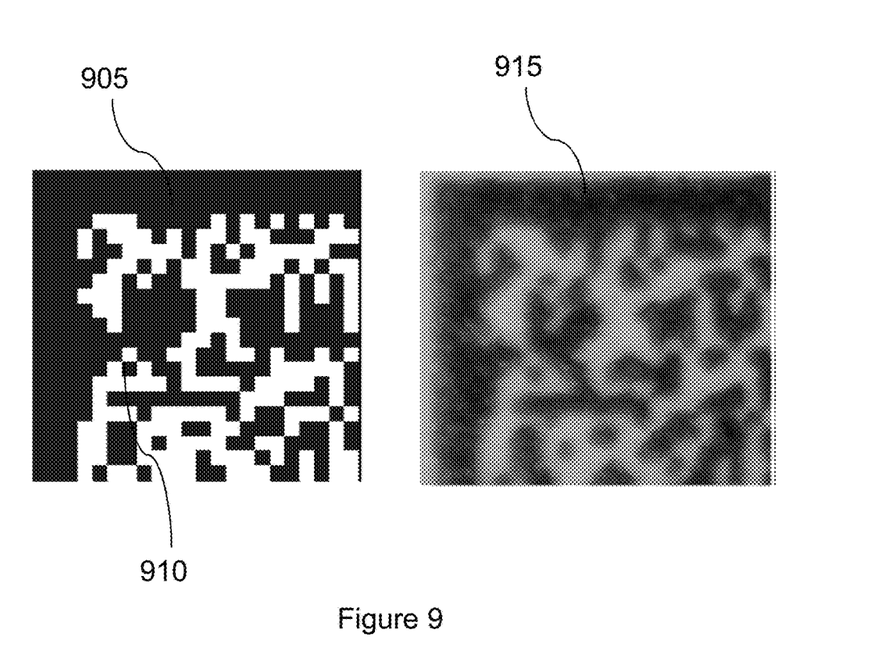
FIG. 9 represents portions of copy-protection mark, respectively digital and analog (printed).

FIG. 9 shows a top left portion 905 of a digital copy-protection code 610 or 735 and the corresponding portion of the printed analog code. As can be seen, the digital copy-protection code consists of a matrix of rectangles 910 occupying cells arranged in rows and columns. Here, these rectangles only have two colors, black and white. In the printed analog code, significant noise due to the code being printed has deformed black rectangles, making some appear and making some disappear, in an unpredictable ad-hoc (ie cell by cell) way.

As a variant to the embodiments of the invention described above, a biometric key, ie determined from biometric data of the user, enables the content of the matrix code 130 to be accessed, to access either the characteristic elements of a photograph or the message stored by the copy-protection code.

In the case when, during the encoding or decoding of the characteristic elements, a symmetrical hash function is implemented to encrypt and verify the fingerprints, the results of the hash function (or "hash") serve, in variants, as a filter to give access to the reading of the message stored by the copy-protection code.

In some variants, the hash of the print of an index finger is used to descramble the copy-protection code or the matrix code.

There are, therefore, several approaches:
descrambling enables the person to be authenticated;
descrambling enables the object to be authenticated;
applying the hash leaves the content (payload) of the code readable (descrambling enables the physical legitimacy of the medium to be authenticated);
applying the hash leaves the identity of the code readable and makes the content (payload) of the code unreadable (access restricted to the payload); and/or
applying the hash makes the code unreadable (high security, without descrambling the symbol remains impossible to interpret).

When the copy-protection code is formed, characteristic points of the photograph of the fingerprint are used, hashed, to scramble the content of the copy-protection code, which is then printed on the original document.

When the copy-protection code is read, characteristic points of the new photograph of the fingerprint are used, hashed, to descramble the content of the copy-protection code, an image of which has been captured.

The hash function is, therefore, preferably symmetrical.

The invention claimed is:

1. Device for securing an object, comprising:
an input component to input a digital file representing a photograph that represents at least one portion of the object;
an image processor for extracting from the digital file, characteristic elements of the photograph by applying image processing, said characteristic elements including biometric data;
an encoder to encode the characteristic elements of the photograph into a matrix code; and
a printer to print the matrix code on or in the object;
wherein the encoder encodes a message in a copy-protection mark, and the matrix code printed by the printer comprises a zone representative of the copy-protection mark.

2. The device according to claim 1, wherein the photograph represents biometric data of a person, the biometric data being visible on the object.

3. The device according to claim 1, wherein the input component comprises an image sensor configured to capture an image of the object on which the matrix code is printed.

4. The device according to claim 1, wherein the matrix code comprises a plurality of zones representing the characteristic elements of the photograph.

5. The device according to claim 1, wherein the encoder encodes the message in the copy-protection mark utilizing the characteristic elements.

6. The device according to claim 5, wherein the encoder scrambles the message according to the characteristic elements.

7. The device according to claim 1, wherein the encoder encodes the characteristic elements utilizing characteristic elements extracted from the photograph.

8. The device according to claim 1, wherein the encoder is configured to compress the photograph.

9. Method for securing an object, comprising the steps of:
inputting a digital file representing a photograph that represents at least one portion of the object;
extracting from the digital file characteristic elements of the photograph by applying image processing;
encoding the characteristic elements of the photograph into a matrix code;
printing the matrix code on or in the object; and
encoding a message in a copy-protection mark, the matrix code comprises a zone representative of the copy-protection mark.

10. The method according to claim 9, wherein the characteristic elements are encoded utilizing the characteristic elements.

11. The method according to claim 9, further comprising the step of compressing the photograph.

12. Device for controlling an object, comprising:
an image capturing component to capture a photograph of at least one portion of the object and a photograph of a matrix code carried by the object;
a decoder to decode characteristic elements of the photograph of said at least one portion of the object encoded in the matrix code; and
a processor to verify a match between the photograph of said at least one portion of the object and the decoded characteristic elements;
wherein the decoder is configured to decode a message in a copy-protection mark incorporated into a zone of the matrix code.

13. The device according to claim 12, wherein the decoder is configured to decode the characteristic elements utilizing characteristic elements extracted from the photograph of said at least one portion of the object.

14. The device according to claim 12, wherein the decoder is configured to decompress the photograph to decode the characteristics elements.

15. Method for controlling an object, comprising the steps of:
capturing a photograph of at least one portion of the object;
capturing a photograph of a matrix code carried by said object;
decoding characteristic elements of the photograph of said at least one portion of the object encoded in the matrix code;
verifying a match between the photograph of at least one portion of the object and the decoded characteristic elements; and
decoding a message in a copy-protection mark incorporated into a zone of the matrix code.

16. The method according to claim 15, wherein the characteristic elements are decoded utilizing characteristic elements extracted from the photograph of said at least one portion of the object.

* * * * *